(12) United States Patent
DeRogatis et al.

(10) Patent No.: US 7,762,533 B2
(45) Date of Patent: Jul. 27, 2010

(54) FASTENERS, RAILING SYSTEM AND METHOD OF ASSEMBLY

(75) Inventors: David DeRogatis, Toms River, NJ (US); Kevin Connor, Toms River, NJ (US)

(73) Assignee: Elk Premium Building Products, Inc., Dallas, TX (US)

(*) Notice: Subject to any disclaimer, the term of this patent is extended or adjusted under 35 U.S.C. 154(b) by 185 days.

(21) Appl. No.: 11/278,510

(22) Filed: Apr. 3, 2006

(65) Prior Publication Data
US 2006/0175592 A1   Aug. 10, 2006

Related U.S. Application Data

(63) Continuation of application No. 10/613,605, filed on Jul. 3, 2003, now abandoned.

(60) Provisional application No. 60/393,125, filed on Jul. 3, 2002.

(51) Int. Cl.
E04H 17/14  (2006.01)
(52) U.S. Cl. ............... 256/67; 256/22; 256/70
(58) Field of Classification Search .......... 256/19, 256/22, 65.01, 67, 70, 21; 403/260, 187–190; 24/457, 458; 411/176, 178, 182, 508–510, 411/403, 424, 913; 248/222.12
See application file for complete search history.

(56) References Cited

U.S. PATENT DOCUMENTS

| | | | |
|---|---|---|---|
| 892,105 A | 6/1908 | White | |
| 1,321,246 A | 11/1919 | Roth | |
| 1,772,159 A * | 8/1930 | Roth | ............ 256/65.08 |
| 2,363,477 A * | 11/1944 | Barton | |
| 2,531,892 A | 11/1950 | Reese | |
| 3,013,244 A | 12/1961 | Rudy | |
| 3,280,466 A | 10/1966 | Helmut | |
| 3,539,234 A | 11/1970 | Rapata | |
| 4,222,680 A | 9/1980 | Browning | |

(Continued)

FOREIGN PATENT DOCUMENTS

CH   440852 A  *  7/1967

(Continued)

OTHER PUBLICATIONS

Bannerelk Trading Company "Designer Rail Aluminum Balusters—Balustar" Jan. 22, 2004, www.trimscrew.com/DECKRAILING.htm.

(Continued)

*Primary Examiner*—Victor MacArthur
(74) *Attorney, Agent, or Firm*—Baker & McKenzie LLP

(57) ABSTRACT

A fastener is configured to affix a first article such as a picket to a second article such as a rail to form a railing or balustrade. The fastener includes a first engaging surface having a maximum diameter configured to engage an interior surface of an opening in the first article and a mating surface configured to mate with the second article. The first engaging surface can have shape selected from cylindrical, ellipsoidal, conical, elliptic conical frustum, pyramidal frustum, and ball and other shapes having cross-sections of rectangular, pentagonal, hexagonal, octagonal and other regular polygons having at least four sides such that good engagement is obtained and the fastener is hidden from view in the assembled railing.

34 Claims, 12 Drawing Sheets

U.S. PATENT DOCUMENTS

| | | | |
|---|---|---|---|
| 4,377,275 A | | 3/1983 | Faber et al. |
| 4,579,324 A | | 4/1986 | McConnell |
| 4,625,948 A | | 12/1986 | Lustvee |
| 4,968,005 A | | 11/1990 | Zen |
| 5,029,820 A | | 7/1991 | Katz |
| 5,131,783 A | * | 7/1992 | Astl ........................... 411/510 |
| 5,164,538 A | | 11/1992 | McClain, III |
| 5,308,205 A | * | 5/1994 | Lautenschlager ........... 411/182 |
| 5,326,061 A | * | 7/1994 | Hamilton ................... 248/235 |
| 5,454,548 A | | 10/1995 | Moore |
| 5,645,282 A | * | 7/1997 | Belter ........................ 411/182 |
| 5,685,682 A | | 11/1997 | Glime et al. |
| 5,878,628 A | * | 3/1999 | Ongaro et al. |
| 6,299,397 B1 | | 10/2001 | Mengel |
| 6,311,957 B1 | | 11/2001 | Driscoll et al. |
| 6,394,422 B1 | | 5/2002 | Jones et al. |
| 6,520,704 B1 | * | 2/2003 | Vidmar et al. .............. 411/510 |
| 6,702,259 B2 | | 3/2004 | Pratt |
| 6,739,786 B2 | | 5/2004 | Reniau |
| 6,758,460 B1 | | 7/2004 | Driscoll |
| 6,789,302 B1 | * | 9/2004 | Preta ........................... 29/432 |
| 6,889,960 B1 | | 5/2005 | Jones |
| 6,932,329 B1 | | 8/2005 | Harder |
| 2004/0188666 A1 | | 9/2004 | Pratt |

FOREIGN PATENT DOCUMENTS

| | | | | |
|---|---|---|---|---|
| FR | 2566852 A1 | * | 1/1986 |
| GB | 2039660 A | * | 8/1980 |
| JP | 2003156019 A | * | 5/2003 |

OTHER PUBLICATIONS

Deckorators.com "Baluster Connectors" Jan. 29, 2004, www.deckorators.com/Connectors.asp.

* cited by examiner

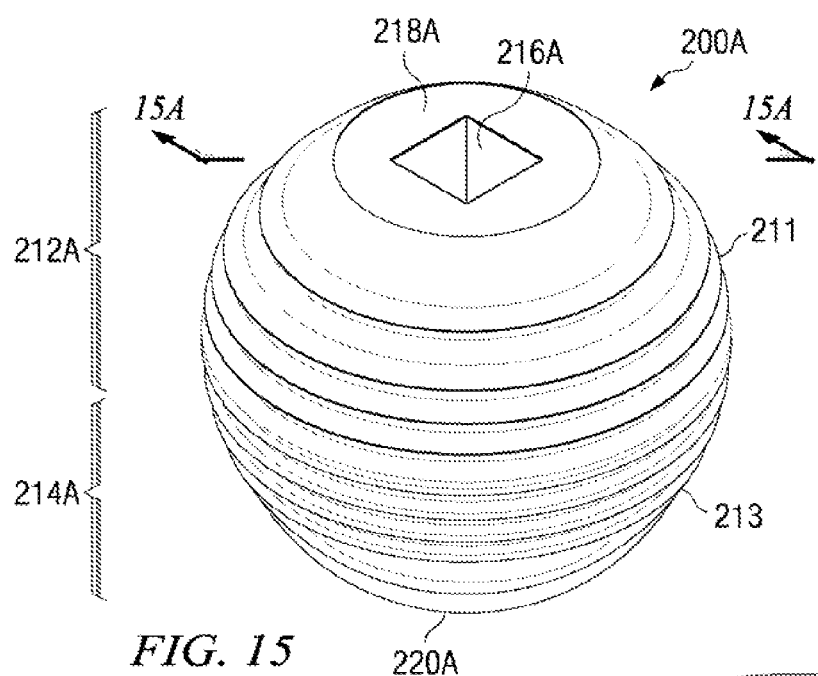
FIG. 15
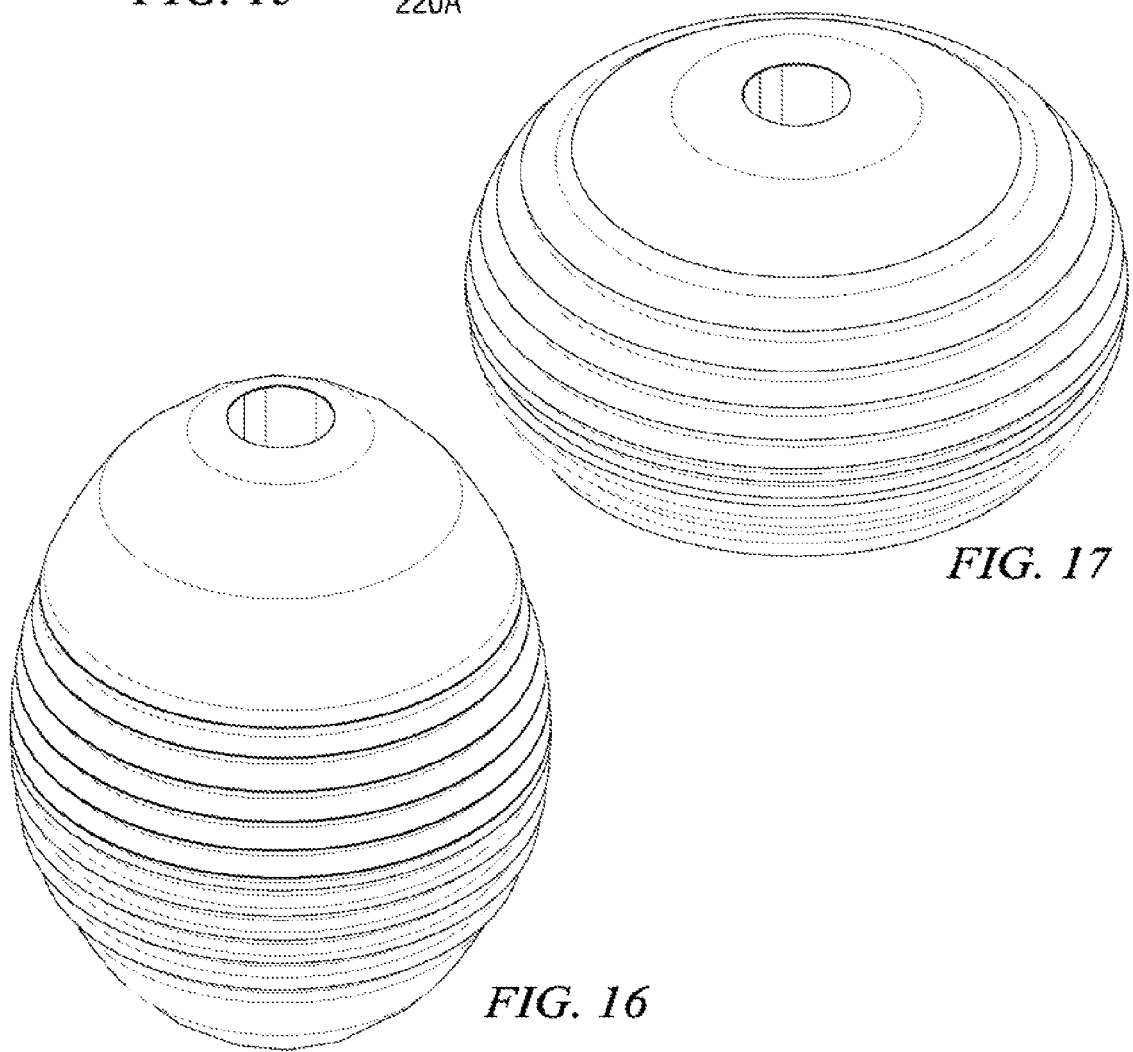
FIG. 17
FIG. 16

FASTENERS, RAILING SYSTEM AND METHOD OF ASSEMBLY

CROSS-REFERENCE TO RELATED APPLICATIONS

This application is a Continuation Application of U.S. patent application Ser. No. 10/613,605, filed Jul. 3, 2003, which claims priority to U.S. Provisional Application Ser. No. 60/393,125, filed on Jul. 3, 2002, both of which are commonly assigned with the present application and incorporated herein by reference in their entirety for all purposes.

TECHNICAL FIELD

The invention is related to fasteners and methods used to assemble a railing, balustrade or fence. More specifically, the invention is concerned with a fastener that can be affixed to opposing ends of a picket or baluster in order to attach the picket to a pair of rails for assembly of a picket fence or balustrade.

BACKGROUND

Picket fences are in widespread use to demarcate property lines and to enclose specific spaces within a property such as a patio, backyard deck, pool, and the like. Such fences incorporate a variety of designs but generally consist of a sequence of vertically aligned, elongate balustrades or pickets that are fastened perpendicularly to horizontal support members or rails with intervening spaces between any two pickets. An early version of the picket fence was comprised of flat rectangular pickets with pointed top ends attached to one side of upper and lower horizontal support members so that the pointed ends of the pickets were exposed and disposed above the upper horizontal member. This design and construction technique presented not only a pleasing, aesthetic appearance but also provided a functional characteristic as the top pointed ends of the pickets discouraged climbing over the fence.

Another type of picket fence is comprised of elongate, rectangular pickets or balustrades that are attached at opposing ends thereof to upper and lower fence rails. With this type of fence, the upper fence rail is located over the top end of the pickets and functions as the uppermost surface or portion of the fence. The pickets are attached to the fence rails by various methods and devices. For instance, the ends of the pickets can be configured into a particular shape or design that is received into cooperating apertures or bores located in the fence rails, such as screw threads formed onto the ends of the pickets and around cooperating bores of the fence rails so that the pickets can be screwed into said fence rails. However, such method of attachment provides an inadequate means of affixing pickets to fence rails if the fence components are manufactured of certain materials that have limited load-bearing capabilities such as plastic or vinyl.

The pickets can also be attached by fasteners such as nails or screws to the fence rails with said means of attachment strengthened as needed by the use of brackets and the like. This method of attachment presents less than a satisfactory appearance as nails and screws may be visible if not properly countersunk and if any brackets are not seated within a depression so that said fasteners and brackets are flush with the surface of the pickets and fence rails.

What is needed then is the provision of a fastening means and a method of assembling picket fences that overcomes the aforementioned disadvantages of assembling picket fences. The subject of the instant invention presents a variety of fasteners that can be used for attaching pickets to upper and lower fence rails and a method for such assembly in order that a picket fence that is stable and secure can be erected using a variety of fence construction materials while also providing the fence with a pleasing and aesthetic appearance. Such fastening means is comprised of fasteners that are inserted at a first portion or end thereof into opposing ends of a picket and inserted at a second portion or end thereof into adjacent fence rails.

Numerous designs for assembling picket fences have been provided in the prior art. Even though these designs may be suitable for the specific individual purposes to which they address, they would not be suitable for the purposes of an aspect of the invention. Such designs are exemplified by U.S. Pat. No. 4,377,275, Railing Construction, issued to Faber et al. on 22 Mar. 1983; U.S. Pat. No. 4,625,948, Picket Fence, issued to Lustvee on 2 Dec. 1986; U.S. Pat. No. 4,968,005, Picket Attachment, issued to Zen on 6 Nov. 1990; U.S. Pat. No. 5,029,820, Wedge-Adjustable Base For Rail Posts and The Like, issued to Katz on 9 Jul. 1991; and U.S. Pat. No. 5,454,548, Modular Metal Fencing And Gratings Employing Novel Fastening Means For Reduction Of Assembly Time, issued to Moore on 3 Oct. 1995.

As such, it may be appreciated that there is a continuing need for a new and improved fastening means and method of assembling picket fences that is comprised of fasteners that are inserted into or otherwise attached at a first portion or end thereof to opposing ends of a picket and inserted at a second portion or end thereof into adjacent fence rails so that a picket fence of various materials such as wood, metal, vinyl, and the like can be assembled quickly and efficiently and with a pleasing and aesthetic appearance. These aspects of the invention substantially departs from the conventional concepts and designs of the prior art, and in so doing provides an apparatus that substantially fulfills this need. Additionally, the prior and commercial techniques do not suggest the present inventive combination of component elements arranged and configured as disclosed herein.

BRIEF SUMMARY

An aspect of the invention, which will be described in greater detail hereinafter, relates to the field of fasteners and methods used to assemble fences. More specifically, this version of the invention is concerned with a fastener that can be affixed to opposing ends of a picket in order to attach said picket to adjacent fence rails for assembly of a picket fence.

According to an aspect of the invention, a fastener is provided to affix a first article such as a picket to a second article such as a rail to form a railing or balustrade. The fastener includes a first engaging surface having a maximum diameter adapted to engage an interior surface of an opening in the first article and a mating surface adapted to mate with the second article. The first engaging surface can have shape selected from cylindrical, ellipsoidal, conical, elliptic conical frustum, pyramidal frustum, and ball and other shapes having cross-sections of rectangular, pentagonal, hexagonal, octagonal and other regular polygons having at least four sides such that good engagement is obtained and the fastener is hidden from view in the assembled railing.

According to an aspect of the invention, a fastener is provided for affixing pickets to fence rails in order to construct a picket fence, the fastener including a cylindrical member and a rectangular member. The cylindrical member and rectangular member are connected at cooperating ends with the cylindrical member and rectangular member presenting opposing, exposed ends. Screw threads are located around the exterior of the cylindrical member, and a series of ridges or protrusion are located on sidewalls of the rectangular member. In a first alternative embodiment of the fastener, the cylindrical member is provided without screw threads. In a second alternate embodiment, the fastener is comprised of a conical member with screw threads surrounding the exterior thereof and a rectangular member connected to a wider end of the conical member. In a third alternative embodiment, the fastener is comprised of a conical member with surrounding screw threads and a hexagonal member connected to a wider end of the conical member.

According to another aspect of the invention, a picket fence is assembled by inserting the rectangular or hexagonal member of a fastener into a bore formed into each end of a picket so that the ridges thereof frictionally engage the sidewalls of said bore and then inserting the cylindrical or conical member of the fasteners, which extend beyond the pickets, into cooperating bores of the fence rails. The pickets can be anchored to the fence rails by rotating said pickets so that the screw threads of the cylindrical or conical member engage the surrounding sidewall of cooperating bores in the fence rails.

If necessary, the spacing of the pickets between the fence rails can be facilitated by use of a measuring guide releasably attached to the side of a container for storage and transport of the pickets. The measuring guide is comprised of two sidewalls that are perpendicularly attached with a series of apertures located in a sidewall thereof. The sidewall with said apertures located therein can be placed over two fence rails so that bores can be drilled into the fence rails using said apertures as a guide.

Using the fasteners and the method described above, a picket fence that is stable and well constructed can be assembled quickly and efficiently. Fasteners are fabricated from exemplary materials including plastics, nylon, polyvinyl chloride, and other deformable materials including but not limited to synthetic rubber and polyurethane, or alternatively, nondeformable materials such as metals including, but not limited to aluminum, zinc, galvanized steel and stainless steel. The pickets and fence rails can be comprised of a variety of materials, such as wood, plastic, vinyl, various metals and the like.

According to another aspect of the invention, a fastening means and method for assembling picket fence is provided in which a fastener includes a cylindrical or conical member and a rectangular or hexagonal member connected thereto. Screw threads or ridges surround the exterior of the cylindrical or conical member and ridges surround the rectangular or hexagonal member; and a plurality of pickets with bores formed into opposing ends thereof for receipt of individual fasteners.

According to another aspect of the invention a fastening means and method is provided for assembling picket fence through use of fasteners that releasably attach pickets to upper and lower fence rails so that a picket fence that is stable and secure can be erected quickly and efficiently with a minimum amount of tools and expenditure of time and effort.

BRIEF DESCRIPTION OF THE DRAWINGS

FIGS. 15-18F and 21 are views illustrating an eighth embodiment of a fastener having a ball shape for insertion into an opening of at least one of a picket or rail.

DETAILED DESCRIPTION OF PREFERRED EMBODIMENTS

Figure 1:
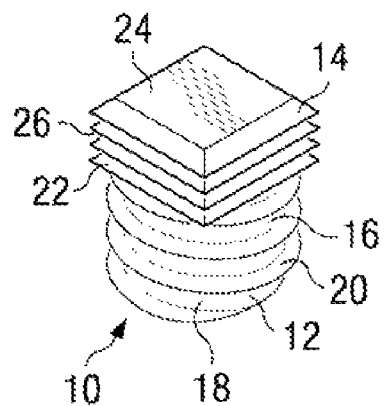
FIG. 1 is a perspective view of a first embodiment of a fastener for assembling picket fence in accordance with an aspect of the invention.
Figure 2:
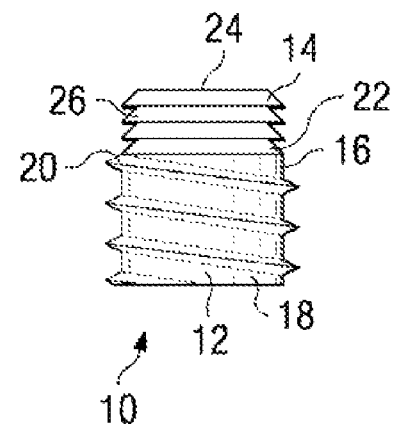
FIG. 2 is a side elevation view of a first embodiment of a fastener for assembling picket fence in accordance with an aspect of the invention.
Figure 3:
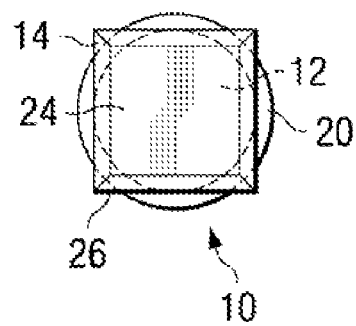
FIG. 3 is a top plan view of the fastener of FIG. 2.

Referring now to the drawings and, in particular, to FIG. 1 through FIG. 3 wherein there are illustrated a first embodiment of a fastener 10 for assembling a picket fence. The fastener 10 is a one-piece, unitary device that is comprised of a cylindrical member 12 and a rectangular member 14. The cylindrical member 12 consists of a first end 16 that is connected to the rectangular member 14 and an opposed second end 18. Screw threads 20 surround the cylindrical member 12. Desirably, fasteners 10 are fabricated of two types: fasteners 10 having screw threads 20 which fasten in a clockwise direction, and fasteners 10 having screw threads 20 which fasten in a counterclockwise direction. The rectangular member is comprised of a first end 22 that is connected to the cylindrical member 12 and a second opposed end 24. A series of parallel ridges 26 is located on the four sidewalls of the rectangular member 14. The rectangular member 14 is desirably sized to fit an opening of a readily available picket 44 (FIG. 5) without requiring the picket 44 to be specially manufactured.

Figure 4:
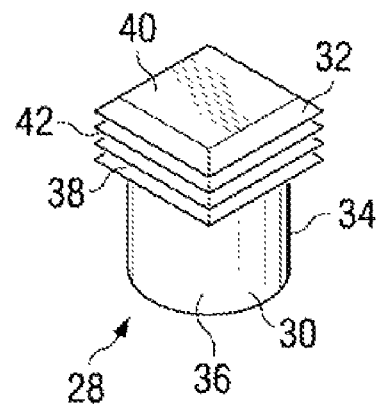
FIG. 4 is a perspective view of a second embodiment of a fastener for assembling picket fence in accordance with an aspect of the invention.

Referring to FIG. 4, therein illustrated is a second embodiment of the fastener 28. The fastener 28 is comprised of a cylindrical member 30 and a rectangular member 32, said cylindrical member 30 consisting of a first end 34 connected to the rectangular member 32 and a second opposed end 36. The rectangular member 32 is comprised of a first end 38 that is connected to the cylindrical member 30 and a second opposed end 40. Parallel ridges 42 are located on the four sidewalls of the rectangular member 32.

The fasteners 10, 28 are comprised of material that is lightweight and durable. Exemplary materials include plastics, nylon, polyvinyl chloride, and other deformable materials including but not limited to synthetic rubber and polyurethane and nondeformable materials such as metals including, but not limited to aluminum, zinc, galvanized steel, carbon steel and stainless steel.

Figure 5:
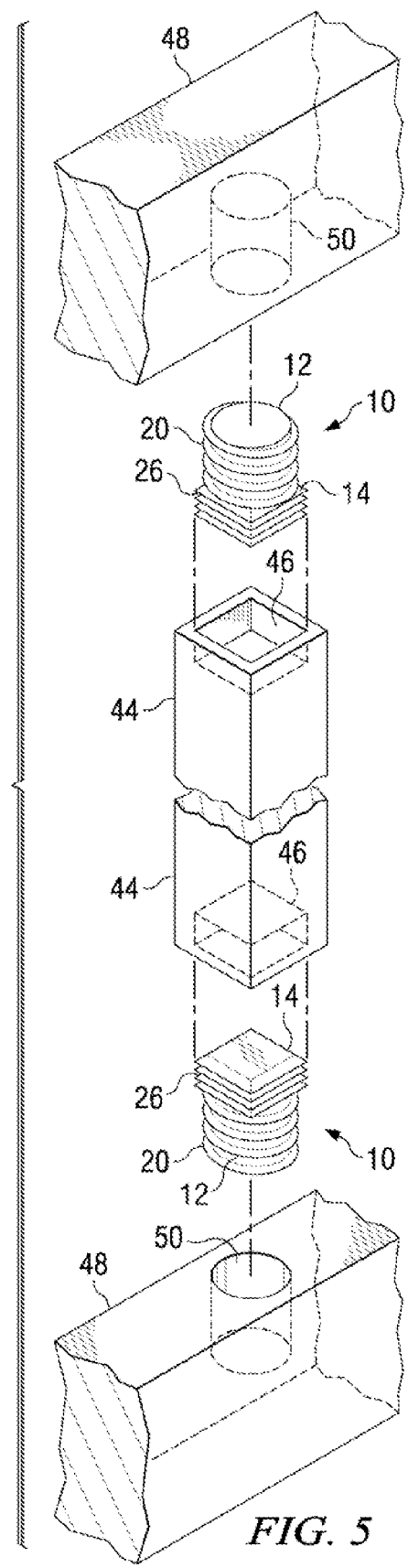
FIG. 5 is a perspective view of a first embodiment of fasteners aligned for insertion into bores located at opposing ends of a picket and into cooperating bores off adjacent fence rails.

As displayed in FIG. 5 a picket fence is being assembled with an elongate, rectangular picket 44 having rectangular bores 46 located at opposing ends thereof. The picket 44 is disposed between upper and lower fence rails 48. Bores 50 are located on facing sides of the fence rails 48. The picket 44 is disposed in perpendicular relation to the fence rails 48 with the bores 46 of the picket 44 in alignment with cooperating bores 50 of the fence rails 48. A first fastener 10 is located between the top end of the picket 44 and an upper fence rail 48, and a second fastener 10 is located between the bottom end of the picket 44 and a lower fence rail 48. The cylindrical member 12 of each fastener 10 is disposed toward a cooperating, cylindrical bore 50 of a fence rail 48, and the rectangular member 14 of each fastener 10 is disposed toward a cooperating, rectangular bore 46 of the picket 44.

Figure 6:
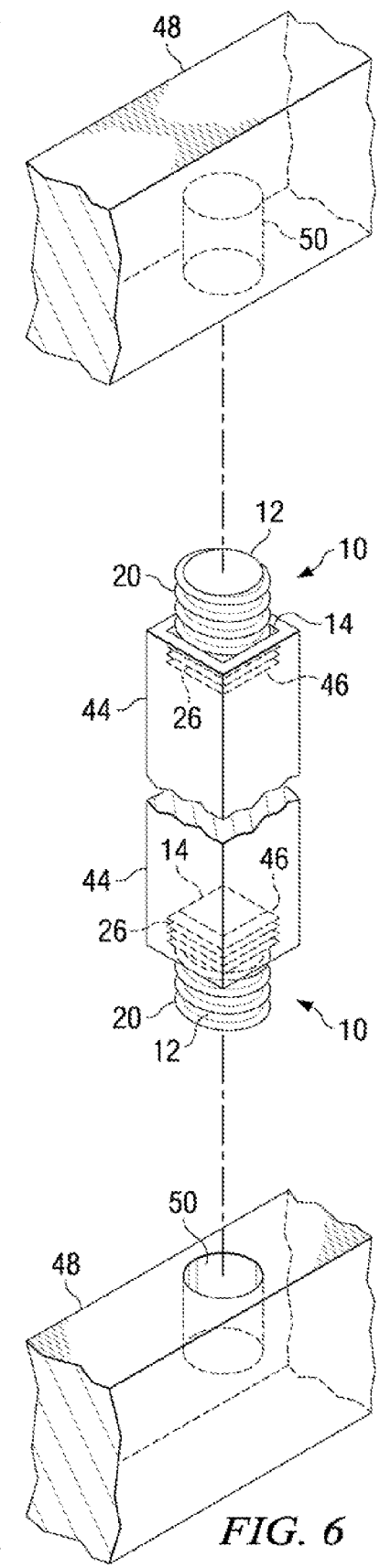
FIG. 6 is a perspective view of a first embodiment of a fasteners inserted into bores located at opposing ends of a picket and aligned for insertion into cooperating bores of adjacent fence rails.
Figure 7:
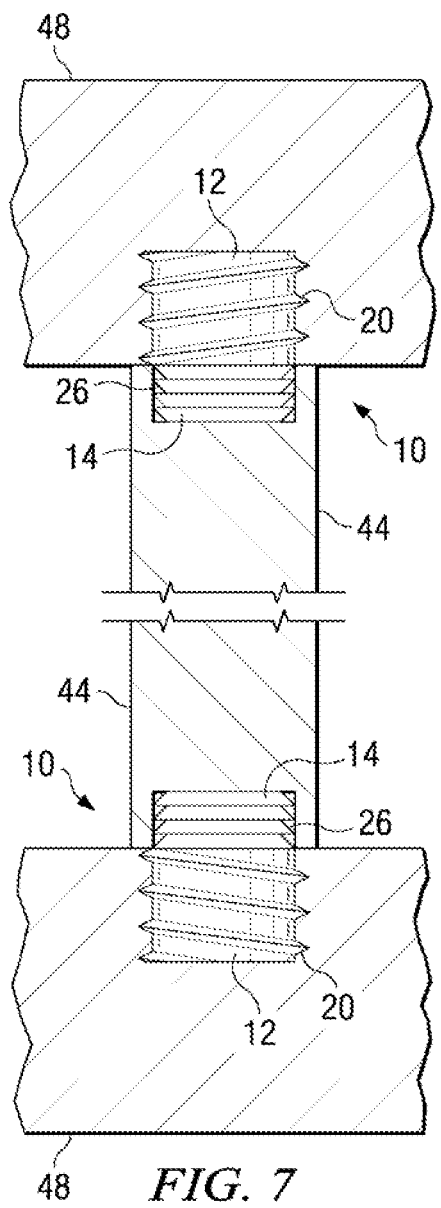
FIG. 7 is a partial cross sectional view of a picket attached at opposing ends to adjacent fence rails, said attachment provided by a first embodiment of fasteners inserted into bores located at opposed ends of said picket and into communicating bores of adjacent fence rails.

Referring to FIG. 6, the fasteners 10 are attached to the picket 44 by means of the rectangular members 14 of the fasteners 10 inserted into the rectangular bores 46 located at opposing ends of the picket 10. The ridges 26 of the rectangular member 14 frictionally engage the communicating sidewalls surrounding the bores 46 so that the fasteners 10 are securely anchored within the bores 46 to the picket 44. Desirably, fasteners 10 having clockwise-fastening screw threads 20 are inserted into first bores 46 of pickets 44 and fasteners 10 having counterclockwise-fastening screw threads 20 are inserted into second bores 46 of pickets 44 on opposite ends of the pickets 44. In such manner, the picket 44 with the fasteners 10 secured thereto can be attached to the fence rails 48 by inserting the exposed cylindrical members 12 of the fasteners into cooperating cylindrical bores 50 of the fence rails 48 and rotating the picket 44 so that the screw threads 20 of the cylindrical members 12 engage the sidewalls of the bores 50 as illustrated in FIG. 7. Preparing the picket 44 by inserting fasteners 10 of clockwise and counterclockwise fastening types in respective opposite ends thereof assures that the fasteners 10 engage the upper rail and lower rail at the same time by the same rotational movement to secure the pickets to the rail.

Figure 8:
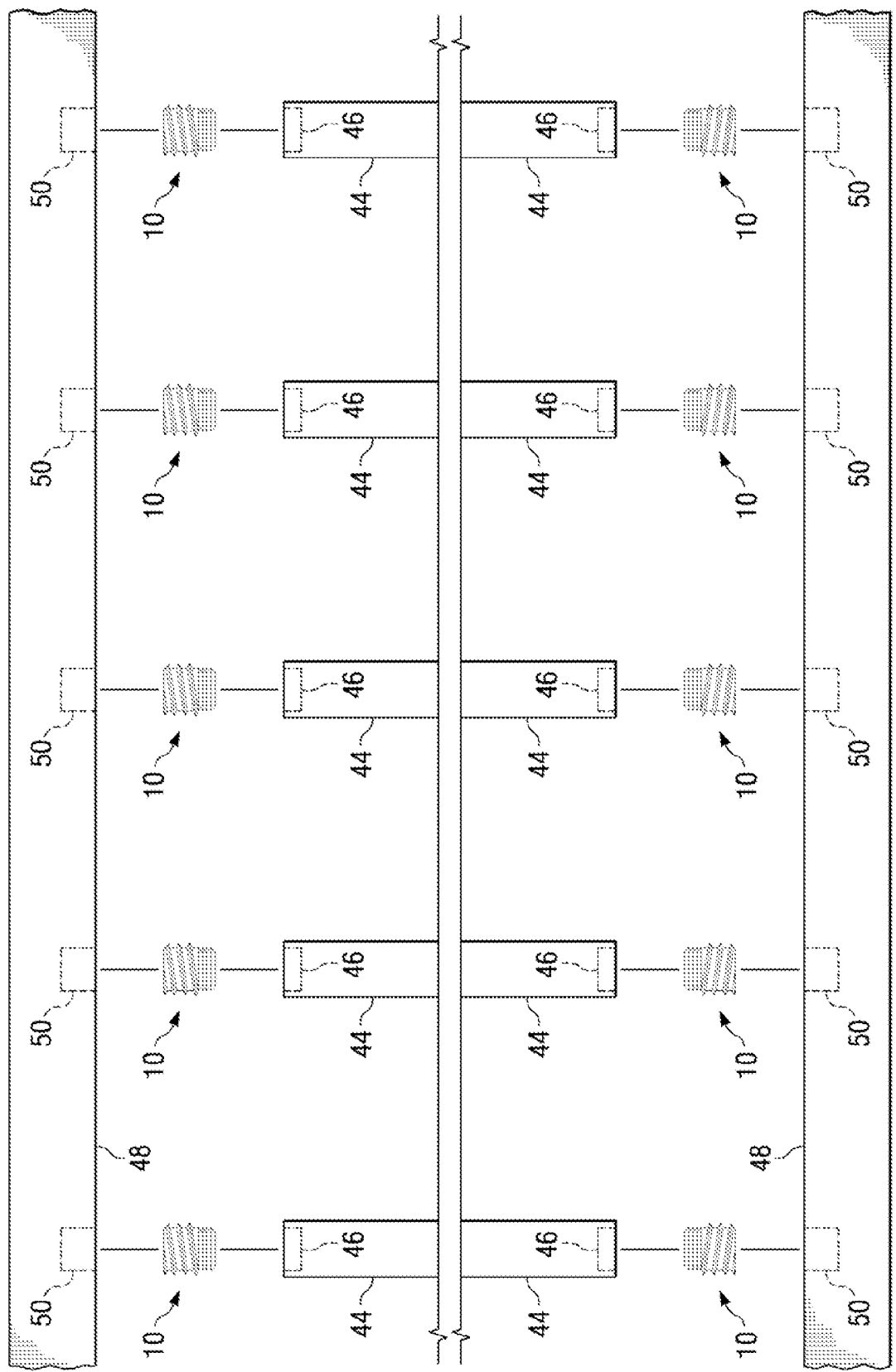
FIG. 8 is a side elevation view of a first embodiment of a series fasteners aligned for attachment to opposing ends of pickets and adjacent fence rails.

As displayed in FIG. 8, a plurality of pickets 44 can be aligned for attachment to upper and lower fence rails 48 to construct a picket fence of varying length and secured to said rails 48 as described previously. The pickets 44 and the fence rails 48 are comprised of material that is lightweight, durable, rigid, and resistant to corrosion and oxidation, such as various wood products, metals and alloys, plastic, vinyl, composite materials, and the like.

Figure 9:
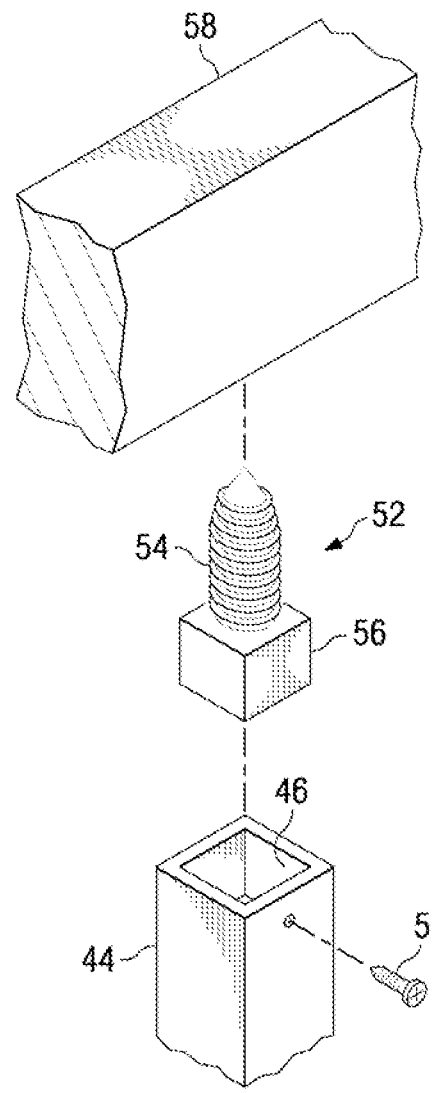
FIG. 9 is a perspective view of a third embodiment of a fastener aligned for insertion into a cooperating bore of a picket and attachment to an adjacent fence rail.

A third embodiment of a fastener 52 is illustrated in FIG. 9 as having a conical member 54 with surrounding screw threads, said conical member 54 tapering from a narrower end to a wider end with said wider end connected to a rectangular member 56. The fastener 52 is aligned between an end of a picket 44 with cooperating bore 46 and a communicating side of a fence rail 58. Two types of fasteners 52 are desirably provided, a first in which the conical member 54 has clockwise-fastening threads, and a second in which the conical member 54 has counterclockwise-fastening threads.

The picket 44 is attached to upper and lower rails 58 by first inserting the rectangular member 56 of the fastener 52 into the bore 46 at opposed ends of the picket 44 so that the rectangular member 56 frictionally engages the surrounding sidewalls of the bore 46 and anchors the fastener 52 to the picket 44. The picket 44 with the fastener 52 disposed therein is placed adjacent to the rails 58 in perpendicular relation and rotated while pressing the conical members 54 of the fasteners 52 against the rails 58 until the conical members 54 engage the rails 58, initially securing the fasteners 52 and picket 44 to said rails 58. The fasteners 52 are then screwed into the rails 58 until the conical members 54 are completely disposed within the rails 58. Desirably, a clockwise-threaded fastener 52 is attached to one end of the picket and a counterclockwise-threaded fastener 52 is attached to the other, such that rotating the picket 44 in one direction engages both of the rails 58 at the same time to secure the picket 44 to the rails 58. The conical members 54 of the fasteners 52 can be attached to the rails 58 with or without a pilot hole formed in said rails 58. It may also be desirable under limited circumstances to further secure the rectangular member 56 of the fastener 52 to the picket 44 by inserting a screw 55 through a sidewall of the bore 46 of the picket 44, for example.

Figure 10:
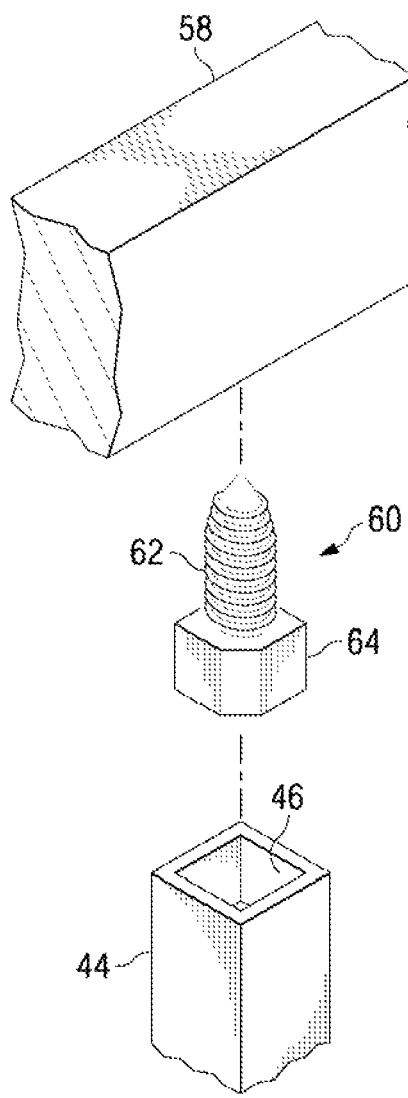
FIG. 10 is a perspective view of a fourth embodiment of a fastener aligned for insertion into a cooperating bore of a picket and attachment to an adjacent fence rail.

Referring to FIG. 10 a fourth embodiment of the fastener 60 is illustrated. The fastener 60 is comprised of a conical member 62 with surrounding screw threads. The conical member 62 tapers from a narrower end to a wider end with said wider end connected to a hexagonal member 64. Two types of fasteners 60 are desirably provided, a first in which the conical member 62 has clockwise-fastening threads, and a second in which the conical member 62 has counterclockwise-fastening threads.

The fasteners 60 are attached to each end the picket 44 by inserting the hexagonal members 64 into the bores 46 at opposed ends of the picket 44 until the sidewalls of the hexagonal members 64 engage cooperating sidewalls of the bores 46, and the conical members extend above the end of the picket 44. Desirably, a clockwise-threaded fastener 60 is attached to one end of the picket and a counterclockwise-threaded fastener 60 is attached to the other. The picket 44 having a fastener 60 secured at each end thereof is aligned between upper and lower rails 58 so that the conical members 62 of the fasteners 60 engage the rails 58, initially securing the fasteners 60 and picket 44 to said rails 58. The fasteners 60 are then screwed into the rails 58 by pressing the conical members 62 against the rails 58 and rotating the picket 44 until the conical members 62 are completely disposed within the rails 58. The conical members 62 of the fasteners 60 can be attached to the rails 58 with or without a pilot hole formed in said rails 58.

Alternatively, the conical member 62 of a fastener 60 can be first inserted into a lower rail 58 until the hexagonal member 64 is positioned in a way that allows the cooperating bore 46 of the picket 44 to thereafter become engaged therewith. Another fastener 60 can then be inserted into an upper rail 58 at a location designed to mate with the lower rail. These steps are repeated to prepare the lower rail having a set of pickets to be joined to the upper rail having a set of corresponding fasteners. The lower rail 58 having the attached pickets is then affixed to the upper rail by the fasteners already attached thereto by slidably engaging the hexagonal members of the affixed fasteners into the cooperating bores of the pickets.

In an alternative embodiment, the fastener 60 can be shaped having a head 64 having a cross-section of a regular convex n-sided shape such as a pentagon, heptagon, octagon, etc. As described above, the head 64 is inserted into a cooperating opening 46 of the picket 44 and the conical member of the fastener 62 is then threadably inserted into a rail 58.

Figure 11:
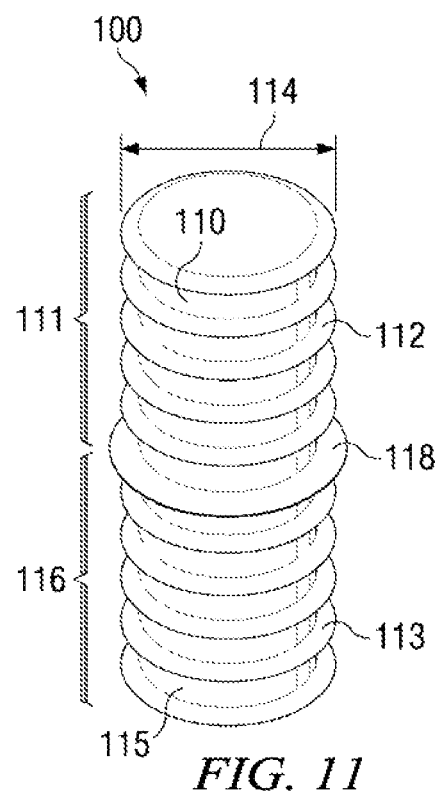
FIG. 11 is a perspective view of a fifth embodiment of a fastener having a cylindrical member for insertion into openings of both a picket and a rail.

A fifth embodiment of a fastener is illustrated in FIG. 11. As shown in FIG. 11, the fastener 100 includes a solid, or alternatively hollow tubular member 110 having a cylindrical shape. The fastener 100 is desirably fabricated of a uniform material for ease of fabrication. Exemplary materials include plastics, nylon, polyvinyl chloride, and other deformable materials including but not limited to synthetic rubber and polyurethane. The member 110 includes a first set of ridges 112 disposed on an exterior surface of a first portion 111 thereof, for use in frictionally engaging an interior surface of a cylindrical opening provided in a longitudinal end of a picket or baluster. The maximum dimensions of the ridges of the fastener 100 are preferably selected to be slightly larger than the internal dimensions of the opening in the picket, e.g. by an amount on the order of hundredths of an inch along diameters 114 of the ridges, such that the ridges frictionally engage the interior surface of the opening in the picket and stay engaged despite stresses that the assembled rail and picket may encounter later. In such case, the ridges and/or the cylindrical member 112 are fabricated of a material and thickness such that some deformation of the ridges and/or the cylindrical member 112 occurs upon inserting the fastener 100 into the opening of the picket.

The fastener 100 is also provided with a second portion 116 having a second set of ridges 113 used to frictionally engage an interior surface of an opening in another member to which the picket is joined, for example, a rail of a railing. As the opening in the rail to be joined to the picket may be of a smaller or larger size than the opening in the picket, either the diameter of the cylindrical member 115, the ridges 113, or both may be varied for that portion 116 of the fastener 100 that is intended to be inserted into the opening of the rail. When the first portion 111 and the second portion 116 have the same diameter, a stop 118 is preferably provided on the exterior surface of the member 110 between the first and second portions 111, 116 which is used for stopping the fastener from being inserted too deeply into one or the other of the picket and the rail to which it is being joined. While the fastener 102 is desirably fabricated in one piece and of uniform material throughout, the first and second portions 111, 116 may be constructed of different materials or different pieces of the same or similar materials and then assembled to make the fastener.

Figure 12:
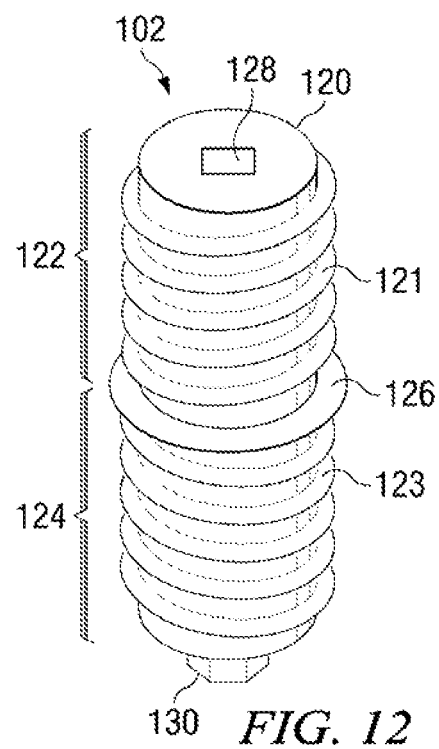
FIG. 12 is a perspective view of a sixth embodiment of a fastener having a cylindrical member for insertion into openings of both a picket and a rail.

A sixth embodiment of a fastener is illustrated in FIG. 12. As shown in FIG. 12, the fastener 102 includes a solid, or alternatively hollow tubular member 120 having a cylindrical shape. The fastener 102 is desirably fabricated of a uniform material for ease of fabrication. Exemplary materials include plastics, nylon, polyvinyl chloride, and other deformable materials including but not limited to synthetic rubber and polyurethane and nondeformable materials such as metals including, but not limited to aluminum, zinc, galvanized steel and stainless steel.

As distinguished from fastener 100 shown in FIG. 11, fastener 102 includes a first set of threads 121 in a first portion 122, and a second set of threads 123 in a second portion 124 thereof. As in the fastener 100 described above, the first portion 122 and second portion 124 may have different diameters. In addition, the first and second portions 112, 124 may have different types of threads; that is different thread pitch and angle. Preferably, the first and second portions are threaded in opposite directions. For example, the first portion can have threads which fasten in a clockwise direction, and the second portion have threads which fasten in a counterclockwise direction. By being so threaded, the fastener can be threaded or tightened in corresponding openings in the picket and the rail at the same time by rotational movement in one direction only. Thus, in an example, the fastener 102 can be threaded into a rail and thereafter threaded into the picket by rotating the picket onto the fastener. Alternatively, the fastener 102 can be threaded into a picket and thereafter threaded into the rail by rotating the picket with the attached fastener into the rail. When the fastener 102 is thus dual threaded, i.e. having both clockwise-fastening and counterclockwise-fastening threads, threading the fastener into the second of the picket or rail will not loosen, but rather only serve to further tighten the fastener into rail or picket into which it has already been screwed. In between the first portion 122 and the second portion 124 a stop 126 is preferably placed such that the fastener 102 is not inserted too deeply into either the picket or the rail. In such manner, the first portion 122 is screwed a desirable depth into the picket and a second portion 124 is screwed a desirable depth into the rail.

While the fastener 102 is desirably fabricated in one piece and of uniform material throughout, the first and second portions 122, and 124, or other components of fastener 102 may be constructed of different materials or different pieces of the same or similar materials and then assembled to make the fastener. For example, it may be desirable to form a first portion 122 of the fastener 102 of a deformable material such as plastic, nylon, polyurethane, etc., for insertion of the first portion 122 into an opening in a picket of hollow tubular construction, e.g. of metal, plastic, polyvinyl chloride or composite material. A second portion 124 of the fastener 102 may desirably be formed of a different material such as solid steel, aluminum, galvanized steel, zinc, etc. for providing a strong, nondeformable surface for screwing the fastener 102 into a smaller opening in a rail, for example.

The fastener 102 is preferably provided with an aperture 128 on at least one end thereof, the aperture preferably being sized and shaped to accommodate standard-sized tools such as those of rectangular cross-section, e.g. a rectangular nut driver or socket wrench, or those having other cross-sections, e.g. hexagonal drivers, also known as "Allen" wrenches, for example. Alternatively, to facilitate turning of the fastener, at least one end of the fastener 102 may be provided with a bolthead 130, which is desirably formed integrally to a surface which spans the cylindrical member 120. Although the bolthead is shown protruding from the end of the cylindrical member 120, it can be joined to a surface that is recessed from the end of the cylindrical member 120.

Figure 13A:
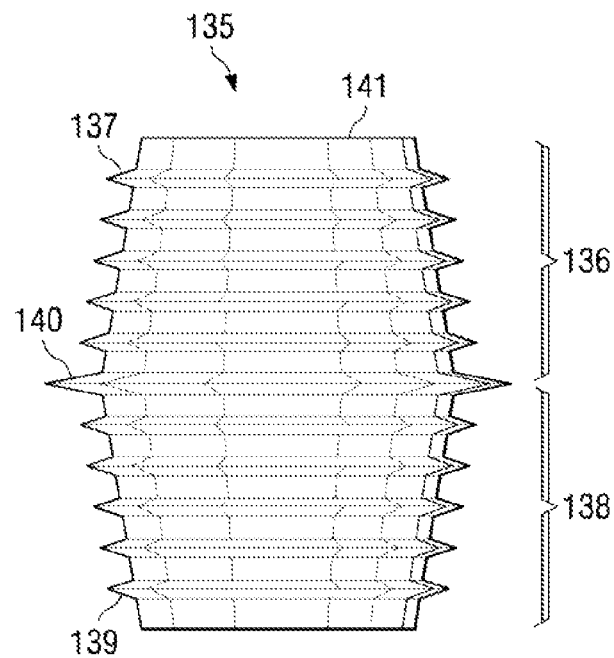
FIG. 13 is a perspective view of a seventh embodiment of a fastener having an elliptic conical frustum shape for insertion into openings of both a picket and a rail.
Figure 13B:
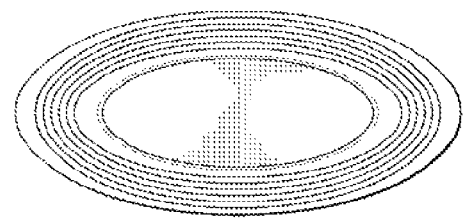

As not all pickets have a cylindrical shape or are otherwise amenable to fastening by cylindrically shaped fasteners, FIGS. 13 and 14 illustrate sixth and seventh embodiments of fasteners of the invention which are intended to be applied to the joining of a picket to a rail when openings are of different shapes. As shown in the perspective drawing of FIG. 13A and the top (plan) view thereof in FIG. 13B, a fastener 135 is provided having a first portion 136 and a second portion 138, each one being in the shape of an elliptic conical frustum. Conical frustums have sidewalls 141 that are curved surfaces of revolution about an axis. A conical frustum is best suited for mating with an opening that also has a curved surface. As described above relative to FIG. 11, the first and second portions of the fastener 135 are desirably provided with sets of ridges 137, 139 for frictionally engaging an interior surface of an opening provided in the rail and/or picket. A stop 140 is also preferably provided such that the fastener 135 is not inserted too deeply into either the rail or the picket.

Figure 14A:
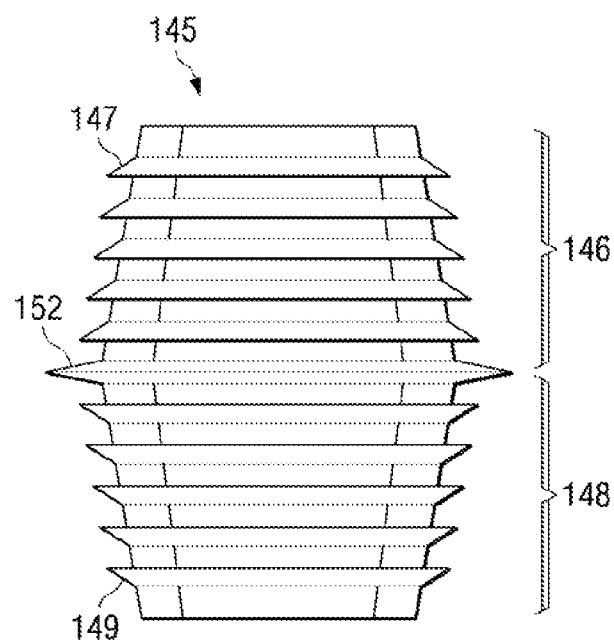
FIG. 14 is a perspective view of an alternative form of a seventh embodiment of a fastener having an elliptic pyramidal frustum shape for insertion into openings of both a picket and a rail.
Figure 14B:
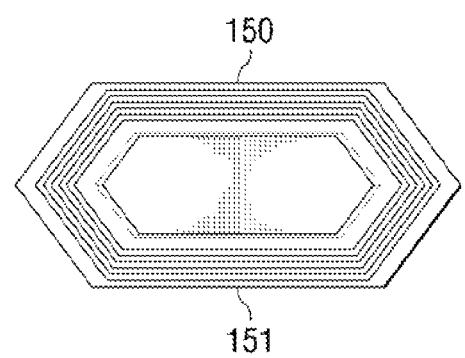

The seventh embodiment of a fastener 145, illustrated in a perspective view in FIG. 14A and in a top (plan) view in FIG. 14B, varies from the sixth embodiment in that the shape of each of the first portion 146 and the second portion 148 is a pyramidal frustum rather than a conical frustum. As such, fastener 145 includes sides 150, 151 that are substantially planar, rather than curved as in the fastener 135 described above relative to FIGS. 13A-13B. The pyramidal fastener 145 is more preferably employed where the opening of the picket or rail has at least some straight sides for which a straight-sided fastener 145 provides a better fit. As described above relative to FIGS. 13A-13B, the first and second portions of the fastener 145 are desirably provided with sets of ridges 147, 149 for frictionally engaging an interior surface of an opening provided in the rail and/or picket. In the illustrated embodiment, a profile view of the ridges 147, 149 has a substantially triangular shape. A stop 152 is also preferably provided such that the fastener 145 is not inserted too deeply into either the rail or the picket.

Figure 15A:
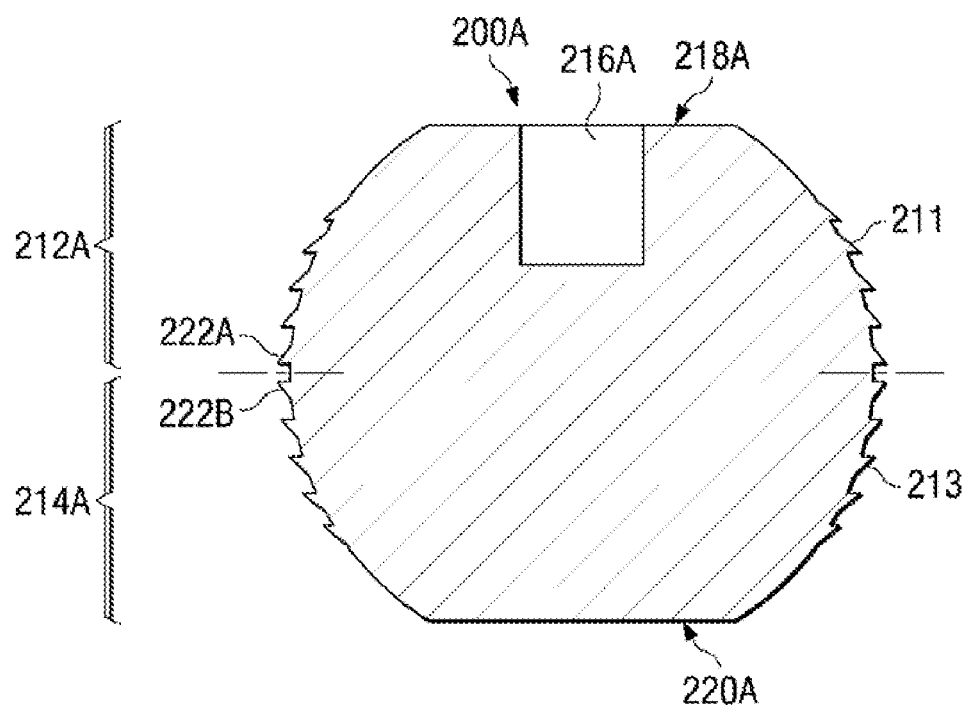
Figure 15B:
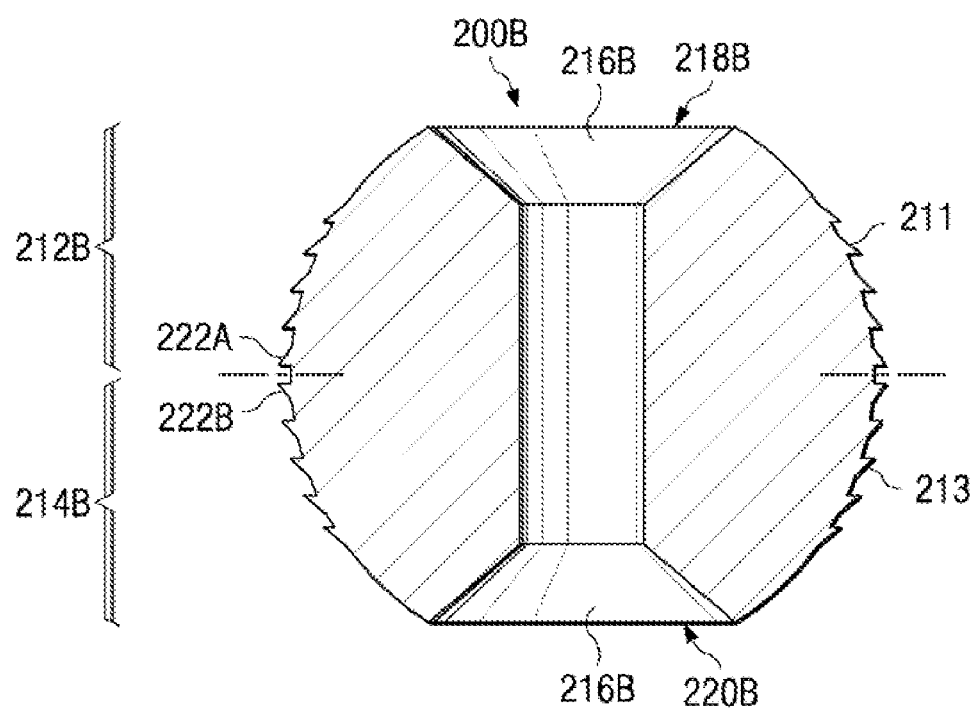
Figure 15C:
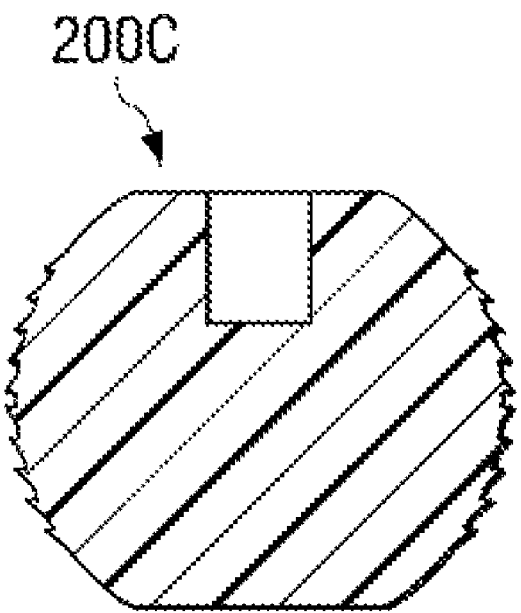
Figure 15D:
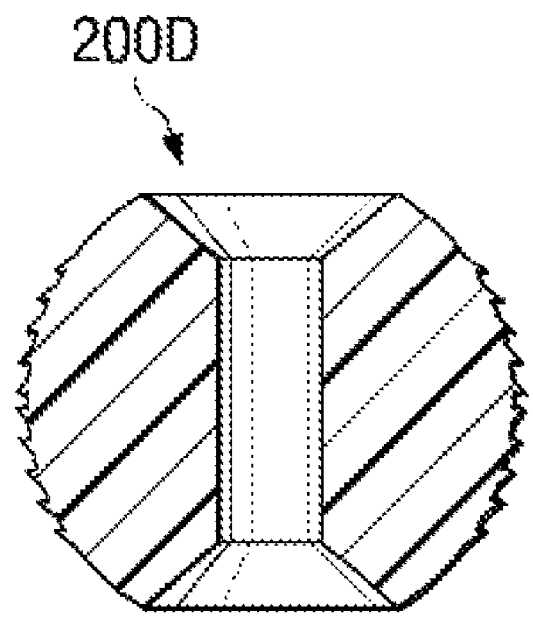
Figure 18A:
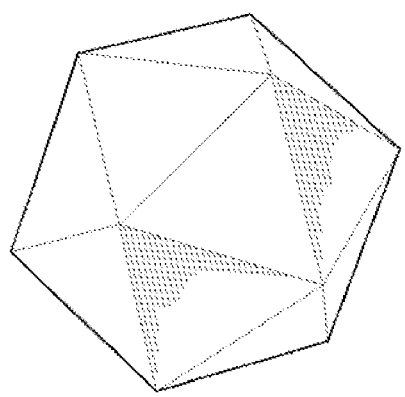
Figure 18D:
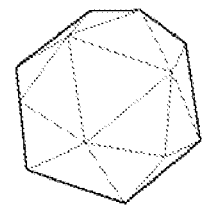
Figure 18B:
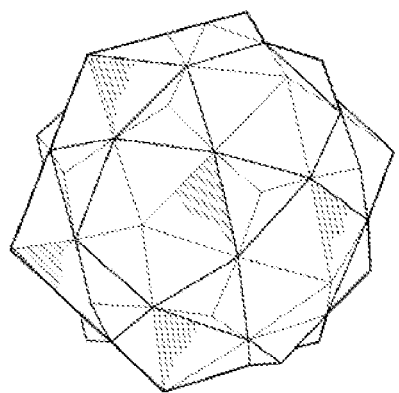
Figure 18E:
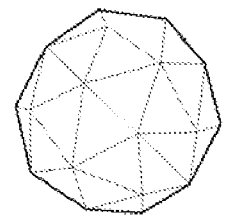
Figure 18C:
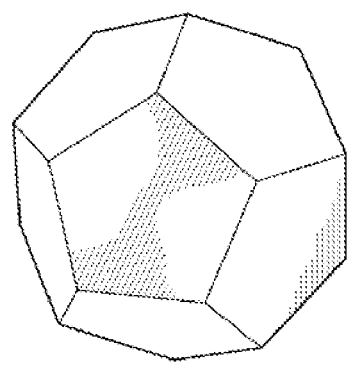
Figure 18F:
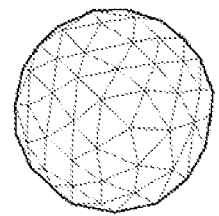

FIGS. 15, 15A and 15B illustrate variations of an eighth embodiment of a fastener 200A, 200B according to the invention. One difference between fasteners 200A, 200B and those shown and described above is that the fasteners 200A, 200B are substantially in the shape of a ball. By "ball" is meant those classes of shapes that are convex and generally round in shape and may be made up of one or more curved surfaces and/or include surfaces which are planar. Thus, as defined herein, "ball" includes but is not limited to the following shapes: sphere (FIGS. 15, 15A and 15B), prolate spheroid (FIG. 16), oblate spheroid (FIG. 17), regular convex polyhedra where the base polygon is at least a pentagon, i.e. a dodecahedron (FIG. 18C), icosahedron (FIG. 18A), and any other shapes, e.g. geodesic domes, that approximate a sphere (such as the shapes shown in FIGS. 18B, and 18D-18F), or approximate the shapes of prolate spheroid or oblate spheroid.

Figure 21:
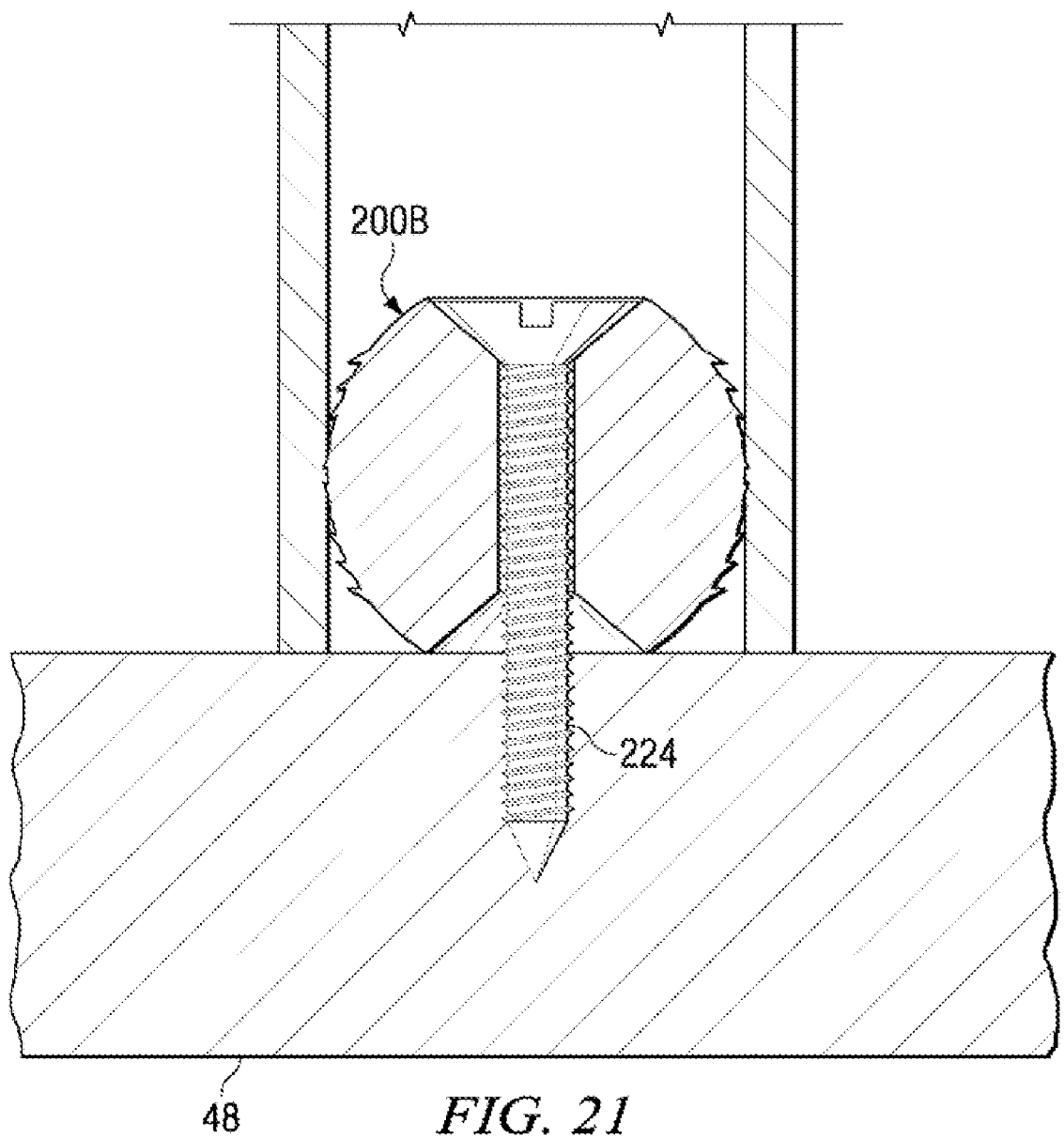

As shown in FIGS. 15, 15A and 15B, the fasteners 200A, 200B are a solid, or alternatively, hollow member having a substantially ball shape. FIG. 15 illustrates an isometric view of a spherical fastener 200A, while FIG. 15A illustrates a cross section view of the fastener 200A in FIG. 15 taken along Line 15A-15A. FIG. 15B illustrates a cross section view of a fastener 200B similar to the fastener 200A in FIG. 15A, but where the opening 216B of the fastener 200B has been altered to include a cylindrical opening 216B having a countersink. FIGS. 15C and 15D illustrate alternative embodiments of the fasteners 200A and 200B in FIGS. 15A and 15B, respectively, but are illustrated as fasteners 200C and 200D manufactured from plastic. For simplicity, the following discussion references only fasteners 200A and 200B, but it is understood that the discussion respectively applies to fasteners 200C and 200D, notwithstanding construction materials. Both fasteners 200A, 200B respectively include a first hemispheroidal portion 212A, 212B (i.e., a first engaging portion 212A, 212B) for engaging a picket (e.g., picket 44), and a second hemispheroidal portion 214A, 214B (i.e., a mating portion 214A, 214B) for engaging a second article, such as a rail 48 to which the picket 44 is to be attached. For both fasteners 200A, 200B, a top surface 218A, 218B and an opposite bottom surface 220A, 220B are substantially flat or truncated, to facilitate ease of placement and assembly onto a facing surface of an item, e.g., a rail 48. The fasteners 200A, 200B are desirably fabricated as a single piece of a uniform material for ease of fabrication. Exemplary materials include nylon, plastic, polyvinyl chloride, and other deformable materials including but not limited to synthetic rubber and polyurethane. The fasteners 200A, 200B preferably include a first set of ridges 211 respectively, disposed on an exterior surface of the first portion 212A, 212B or first engaging portion 212A, 212B thereof, for use in frictionally engaging an interior surface of a cylindrical opening provided in a longitudinal end of a picket or baluster 44. The maximum dimensions of the ridges of the fasteners 200A, 200B are preferably selected to be slightly larger than the internal dimensions of the opening in the picket 44, e.g., by an amount on the order of hundredths of an inch along the diameter of the ridges, such that the ridges frictionally engage the interior surface of the opening in the picket 44 and stay engaged despite stresses that the assembled rail 48 and picket 44 may encounter later. In such case, the fasteners 200A, 200B and/or the ridges 211 are fabricated of a material and thickness such that some deformation of the ridges and/or the underlying ball occurs upon inserting the fasteners 200A, 200B into the opening of the picket 44. FIG. 21 illustrates a cross-sectional close-up view of fastener 200B shown in FIG. 15B employed in a connected assembly.

The fasteners 200A, 200B are also provided with a second portion 214A, 214B having a second set of ridges 213 used to frictionally engage an interior surface of an opening in another member to which the picket is joined, for example, a rail of a railing. The ridges 213 of the second set are desirably slanted in the opposite direction from, but directed towards, the ridges 211 of the first set such that the ridges 213 frictionally engage a first opening in one item, e.g. a rail, while ridges 211 frictionally engage an opening in another item, e.g. a picket.

A stop may be provided on the exterior surface of the fasteners 200A, 200B between the first portion 212A, 212B and second portion 214A, 214B, for use in stopping the fastener 200A, 200B from being inserted too deeply into one or the other of the picket and the rail to which it is being joined. As illustrated, maximum diameter ridges 222A, 222B may simply be the ridges 211, 213 of either or both the first and second portions 212A, 212B, 214A, 214B having the outermost diameters, i.e., the ridges 211, 213 having the largest diameters when compared to others of the ridges. As may be clearly seen from FIGS. 15, 15A and 15B, in some embodiments, these outermost ridges 222A, 222B may provide the maximum ridge diameter for either or both portions 212A, 212B, 214A, 214B of the fastener 200A, 200B to engage their respective items (e.g., a picket or a rail). As can be seen in FIGS. 15A and 15B, the first and second hemispheroidal portions are symmetrical in construction to one another about their plane of opposition (illustrated by the lines separating the first portions 212A, 212B from the second portions 214A, 214B). While the fasteners 200A, 200B are desirably fabricated in one piece and of uniform material throughout, the first and second portions 212A, 212B, 214A, 214B, or other components of fasteners 200A, 200B may be constructed of different materials or different pieces of the same or similar materials and then assembled to make the fastener.

The fastener 200A is preferably provided with an aperture 216A on at least one end thereof, the aperture 216A being sized and shaped to accommodate standard-sized tools such as those of rectangular cross-section (opening 216A in FIG. 15A), e.g. a rectangular nut driver or socket wrench, or those having other cross-sections, e.g. hexagonal drivers, also known as "Allen" wrenches, for example. In such case, the aperture 216A provides a way of applying torque to insert a lower portion 214A of the fastener 200A into an item such as a rail.

Alternatively, the aperture may be a countersink 216B, such as the countersink 216B shown in FIG. 15B, for retaining a screw or bolt (e.g., screw 224 shown in FIG. 21) of length sufficient to pass through the fastener 200B from the side of the aperture 216B to the opposite side, the screw or bolt 224 then threadably engaging another item, e.g. the rail 48 thereunder.

Alternatively, to facilitate turning of the fastener, at least one end of the fasteners 200A may be provided with a bolthead (such as that shown and described above relative to FIG. 12) in the place of aperture 216A, the bolthead being desirably formed integrally to a top surface 218A of the fastener 200A. In such case, the bolthead provides a way of applying torque to insert a lower portion 214A of the fastener 200A into an item such as a rail.

In a preferred method of assembling a picket 44 to a rail 48 to form an element of a railing or balustrade, the fastener 200A, 200B is placed, bottom side 220A, 220B down on a rail 48, leaving the top surface 218A, 218B exposed. The body of a screw or bolt 224 is threadably inserted into or, alternatively, passed through the fasteners 200A, 200B to threadably engage the rail 48 below, while the screwhead, bolthead, or tool-receiving aperture 216A (or countersink 216B) of the fasteners 200A, 200B remains accessible from a top surface 218A, 218B to allow torque to be applied to affix the fastener 200A, 200B to the rail 48. Thereafter, a cooperating opening of the picket 44 is then inserted over the fasteners 200A, 200B to affix the picket 44 to the rail 48. The cooperating opening can have a variety of shapes, such as cylindrical, conical, rectangular, hexagonal or other regular polygon, as well as in the shape of a half-ball or section of a ball, as that term is defined herein.

To continue making a balustrade, the process is then repeated by affixing fasteners 200A, 200B at desired spacings, and affixing pickets thereto to make an assembly having a rail and a plurality of pickets affixed thereto. This represents a "lower" rail of the balustrade, for example. Then, fasteners 200A, 200B are affixed to a second rail at desired spacings. The balustrade is then completed by mating the pickets that are affixed to the lower rail to the fasteners 200A, 200B that are affixed to the second, upper rail.

While in many railings or balustrades the pickets or balusters are oriented at right angles, many occasions arise when pickets must be oriented at other than right angles, e.g. stairways, in which case at least one of the angles that the baluster makes relative to the rail is acute. The ball-shape of fasteners 200A, 200B makes them well-suited for this purpose because the angle that each ball-shaped fastener 200A, 220B makes relative to the opening in a picket can change while the fastener 200A, 200B still continues to frictionally engage the opening.

FIGS. 16, 17 and 18A through 18F illustrate alternative ball shapes to which fasteners 200 may be constructed in preferred embodiments, bearing in mind, that in each case, a top surface and a bottom surface of the shape are preferably opposing parallel planes, for ease of assembly of the rail to picket.

Figure 19:
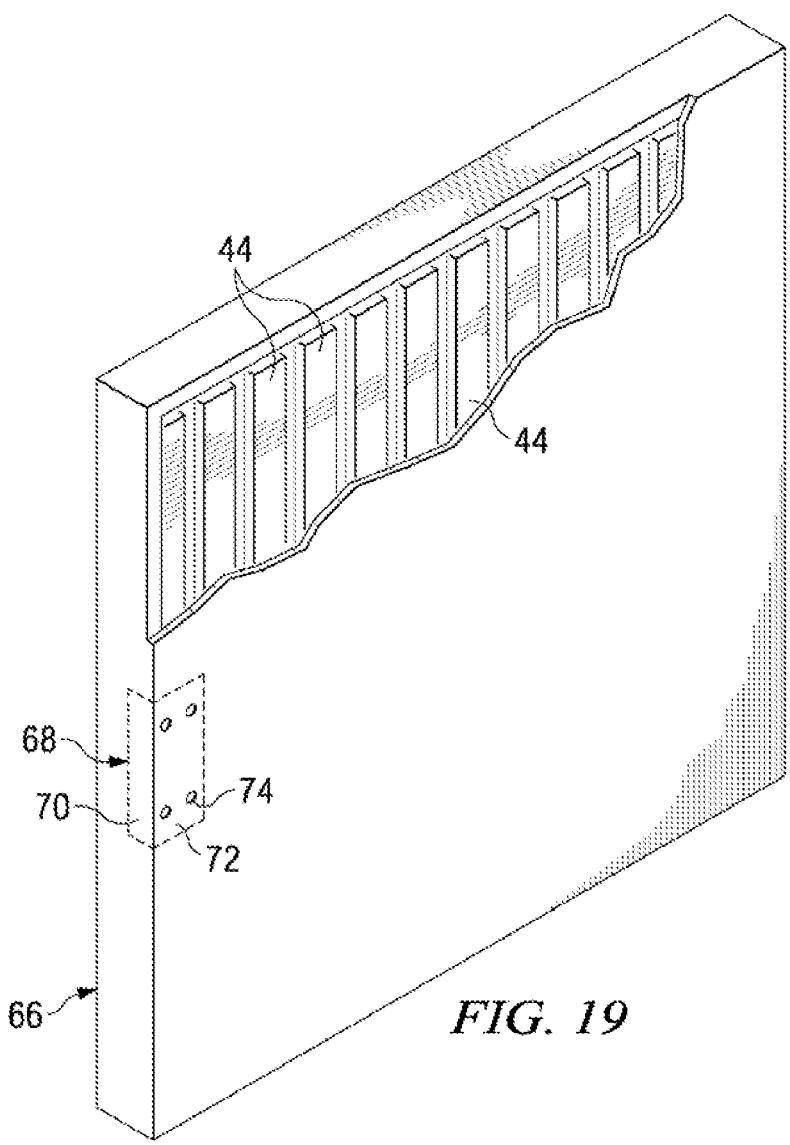
FIG. 19 is a fragmentary perspective view of a storage and transport container of pickets illustrating a plurality of pickets stored therein and a hole measuring guide located at an exterior corner of said container.
Figure 20:
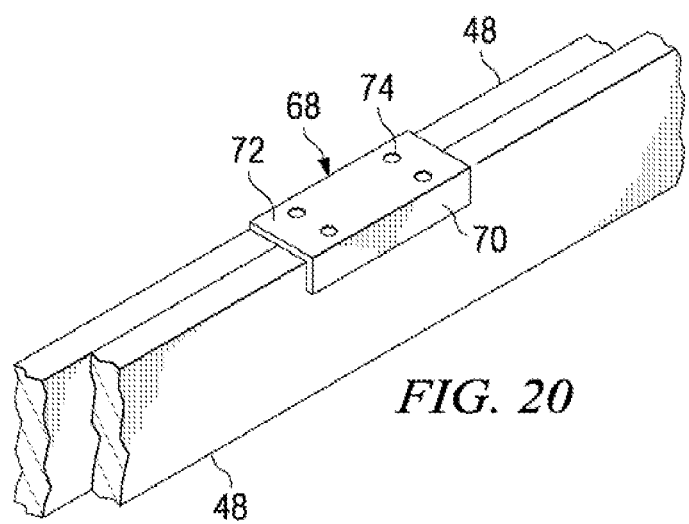
FIG. 20 is a perspective view of a hole measuring guide positioned over two fence rails in order to provide the location at which bores can be drilled for insertion of fasteners therein.

A container 66 for storing and transporting pickets 44 is illustrated in FIG. 19. The container 66 is equipped with a hole measuring guide 68 that can be attached to the container 66 by various means, such as perforation, VELCRO.®, adhesion, and the like. The hold measuring guide 68 is comprised of a first sidewall 70 and a second sidewall 72, said sidewalls 70, 72 disposed in perpendicular relation to each other. A plurality of apertures 74 is located in the second sidewall 72 thereof. The apertures 74 are positioned so as to coincide with the proper or intended spacing or positioning of bores within the fence rails 48, 58. As such, the hole measuring guide 68 can be positioned over two adjacent fence rails 48 as shown in FIG. 20 so that apertures or bores can be placed within said fence rails 48 in precise locations thereon by drilling, routing or similar processes.

While various embodiments of the disclosed principles have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A connected assembly, comprising:
a first article having an opening on at least one end;
a second article having a planar surface;
a plug fastener fixedly connecting the at least one end of the first article against the second article's planar surface, the plug fastener comprising:
a first hemispheroidal portion,
a second hemispheroidal portion opposed to the first hemispheroidal portion, the first and second hemispheroidal portions being symmetrical to one another about their plane of opposition, each hemispheroidal portion comprising:
a mating surface truncating the respective hemispheroidal portions, the mating surface defining a mating plane that is parallel to the plane of opposition whereby the mating planes of the respective first and second hemispheroidal portions are opposite from each other across the plane of opposition, and
ridges extending outwardly from the respective hemispheroidal portions between the mating surfaces and the plane of opposition, and frictionally engaging an interior surface of the first article opening, and an aperture extending through the first and second hemispheroidal portions, and between openings in the first and second mating surfaces; and a fastening device passing through the aperture and into the second article, either the first or second mating surface seated on the second article's planar surface.

2. A connected assembly according to claim 1, wherein the ridges are deformable ridges so as to frictionally engage the opening in the first article by deforming when the first article is placed at any angle with respect to the second article's planar surface to conceal the plug fastener.

3. A connected assembly according to claim 2, wherein the plug fastener deformable ridges comprise a material selected from the group consisting of plastic, nylon, polyvinyl chloride, and polyurethane.

4. A connected assembly according to claim 1, wherein a profile view of the ridges has a substantially triangular shape.

5. A connected assembly according to claim 1, wherein the ridges extend substantially parallel to the plane of opposition.

6. A connected assembly according to claim 1, wherein the mating surfaces each comprise a tapered countersink descending respectively therein and the fastening device comprises a woodscrew having a substantially tapered head, the head of the screw locatable within either countersink.

7. A connected assembly according to claim 1, wherein the ridges on the first hemispheroidal portion are directed towards the ridges on the second hemispheroidal portion.

8. A connected assembly according to claim 1, wherein the plug fastener fixedly connects the at least one end of the first article against the second article's planar surface at the angle between 45° to 90°.

9. A connected assembly according to claim 1, wherein the plug fastener fixedly connects the at least one end of the first article against the second article's planar surface such that the first article does not pivot with respect to the second article's planar surface.

10. A connected assembly according to claim 1, wherein the first article is a baluster and the second article is a rail.

11. A connected assembly according to claim 1, wherein the ridges outwardly extending from the exterior surfaces of the hemispheroidal portions substantially define a substantially spherical shape for the plug fastener.

12. A connected assembly according to claim 1, wherein the first and second hemispheroidal portions define a substantially spherical shape.

13. A connected assembly, comprising:
a first article having an opening on at least one end;
a plug fastener comprising:
  (a) a first hemispheroidal portion,
  (b) a second hemispheroidal portion opposed to the first hemispheroidal portion, the first and second hemispheroidal portions being symmetrical to one another about their plane of opposition, each hemispheroidal portion comprising:
    (i) a mating surface truncating the respective hemispheroidal portions, the mating surface defining a mating plane that is parallel to the plane of opposition whereby the mating planes of the respective first and second hemispheroidal portions are opposite from each other across the plane of opposition, and
    (ii) ridges extending outwardly from the respective hemispheroidal portions between the mating surfaces and the plane of opposition, and frictionally engaging an interior surface of the first article opening, and
  (c) an aperture extending through the first and second hemispheroidal portions, the aperture having a first countersink defined within an opening in the first mating surface and a second countersink defined within an opening in the second mating surface; and
a second article having a planar surface;
a fastening device passing through the aperture and into the second article to seat either of the first and second mating surfaces on the second article's planar surface, a head of the fastening device located within a corresponding one of the countersinks; and
wherein the first article's opening is disposed over the plug fastener such that the at least one end is substantially adjacent to the second article's planar surface and the plug fastener is concealed within the first article.

14. A connected assembly according to claim 13, wherein the ridges are deformable ridges so as to frictionally engage the opening in the first article by deforming when the first article is placed at any angle with respect to the second article's planar surface to conceal the plug fastener.

15. A connected assembly according to claim 14, wherein the plug fastener and deformable ridges comprise a material selected from the group consisting of plastic, nylon, polyvinyl chloride, and polyurethane.

16. A connected assembly according to claim 13, wherein a profile view of the ridges has a substantially triangular shape.

17. A connected assembly according to claim 13, wherein the ridges extend substantially parallel to the plane of opposition.

18. A connected assembly according to claim 13, wherein the countersinks are tapered.

19. A connected assembly according to claim 13, wherein the ridges on the first hemispheroidal portion are directed towards the ridges on the second hemispheroidal portion.

20. A connected assembly according to claim 13, wherein the plug fastener fixedly connects the at least one end of the first article against the second article's planar surface at the angle between 45° to 90°.

21. A connected assembly according to claim 13, wherein the plug fastener fixedly connects the at least one end of the first article against the second article's planar surface such that the first article does not pivot with respect to the second article.

22. A connected assembly according to claim 13, wherein the first article is a baluster and the second article is a rail.

23. A connected assembly according to claim 13, wherein the ridges outwardly extending from the exterior surfaces of the hemispheroidal portions define a substantially spherical shape for the plug fastener.

24. A connected assembly according to claim 13, wherein the first and second hemispheroidal portions define a substantially spherical shape.

25. A railing assembly, comprising:
a baluster having an opening on at least one end;
a rail having a planar surface;
a plug fastener connecting the at least one end of the baluster against the rail's planar surface, the plug fastener comprising:
  (a) a first hemispheroidal portion,
  (b) a second hemispheroidal portion opposed to the first hemispheroidal portion, the first and second hemispheroidal portions being symmetrical to one another about their plane of opposition, each hemispheroidal portion comprising:
    (i) a mating surface truncating the respective hemispheroidal portions, the mating surface defining a mating plane that is parallel to the plane of opposition whereby the mating planes of the respective first and second hemispheroidal portions are opposite from each other across the plane of opposition, and (ii) deformable ridges extending outwardly from the respective hemispheroidal portions between the mating surfaces and the plane of opposition, and frictionally engaging an interior surface of the opening in the baluster by deforming when the baluster is placed at any angle with respect to the rail's planar surface to conceal the plug fastener, and (c) an aperture extending through the first and second hemispheroidal portions, and between openings in the first and second mating surfaces; and a fastening device passing through the aperture and into the rail, either of the plug fastener's mating surfaces seated on the rail's planar surface; and wherein the baluster's opening is disposed over the plug fastener such that the at least one end is adjacent to the rail's planar surface and the plug fastener is concealed within the baluster.

26. A railing assembly according to claim 25, wherein the plug fastener and deformable ridges comprise a material selected from the group consisting of plastic, nylon, polyvinyl chloride, and polyurethane.

27. A railing assembly according to claim 25, wherein the ridges extend parallel to the plane of opposition.

28. A railing assembly according to claim 25, wherein the mating surfaces each comprise a tapered countersink descending respectively therein, a head of the fastening device locatable within either countersink.

29. A railing assembly according to claim 25, wherein the ridges on the first hemispheroidal portion are directed towards the ridges on the second hemispheroidal portion.

30. A railing assembly according to claim 25, wherein the plug fastener fixedly connects the at least one end of the first article against the second article's planar surface at the angle between 45° to 90°.

31. A railing assembly according to claim 25, wherein the plug fastener fixedly connects the at least one end of the baluster against the rail's planar surface such that the baluster does not pivot with respect to the rail's planar surface.

32. A railing assembly according to claim 25, wherein a profile view of the ridges has a triangular shape.

33. A railing assembly according to claim 25, wherein the ridges outwardly extending from the exterior surfaces of the hemispheroidal portions define a substantially spherical shape for the plug fastener.

34. A railing assembly according to claim 25, wherein the first and second hemispheroidal portions define a substantially spherical shape.

* * * * *